United States Patent [19]

Ballon et al.

[11] Patent Number: 4,553,062

[45] Date of Patent: Nov. 12, 1985

[54] CURVED GAS-FILLED DETECTOR WITH AVALANCHE OF ELECTRONS, AND STRIP

[75] Inventors: Jean Ballon, Saint Jean de Moirans; Vincent Comparat; Joseph Pouxe, both of Grenoble, all of France

[73] Assignee: Centre National de la Recherche Scientifique, Paris, France

[21] Appl. No.: 559,794

[22] Filed: Dec. 9, 1983

[30] Foreign Application Priority Data

Dec. 30, 1982 [FR] France ................................ 82 22219

[51] Int. Cl.[4] ........................... H01J 1/90; G01T 1/18

[52] U.S. Cl. ........................................ 313/93; 250/385

[58] Field of Search ............................ 313/93; 250/385

[56] References Cited

U.S. PATENT DOCUMENTS 4,031,396 6/1977 Whetten et al. .................. 313/93 X
4,075,527 2/1978 Cummings ............................ 313/93
4,306,155 12/1981 Cotic ................................ 313/93 X

FOREIGN PATENT DOCUMENTS 2370360 6/1978 France .

OTHER PUBLICATIONS

"Curved Position-Sensitive Detector for X-Ray Crystallography", by T. Izumi, *Nuclear Instruments and Methods*, vol. 177, (1980), pp. 405-409.

*Primary Examiner*—Palmer C. DeMeo
*Attorney, Agent, or Firm*—Weingarten, Schurgin, Gagnebin & Hayes

[57] ABSTRACT

Gas-filled detector for locating the presence in space of particles or radiations. The detector according to the invention comprises a curved body containing a gaseous fluid under pressure, and being provided with a window, and on the inside, an elongated element forming means of picking-up an avalanche of elements, said means being constituted by a structure of the type with at least one curved conducting strip held in such a way by the body that it projects into the enclosure and that one of its longitudinal edges is parallel to the axis of the window. The invention finds an application in X-ray crystallography.

9 Claims, 9 Drawing Figures

CURVED GAS-FILLED DETECTOR WITH AVALANCHE OF ELECTRONS, AND STRIP

The present invention relates to gas-filled detectors such as used to locate the presence in space of particles or radiations.

Many applications are concerned with spatially detecting and localizing the presence of particles or radiations. Examples of such applications are: X-ray crystallography, the detection of radioactivities, medical or biological research, the detection of particles around accelerators.

A gas-filled detector of the aforesaid type generally comprises a body defining an enclosure containing a gaseous fluid under a certain pressure.

The enclosure is provided with a window for the admission of a radiation or particle to be detected, and comprises on the inside, at least one elongated element generally parallel to the window. Said elongated element is insulated from the body and is found to have a high positive potential with respect to the body or to cathode-forming electrodes which surround said elongated element.

The impact of an elementary particle admitted through the window creates one or more primary electrons which are attracted by the electrical field produced by the positive potential applied to the anode-forming elongated element. Under the influence of said field, these electrons migrate towards the anode and initiate, when the electrical field permits, a process of chain-collisions which produces an avalanche of electrons picked-up by the anode. The method used for locating the avalanche is a conventional one consisting in determining the center of gravity by means of cathode bands measuring the collecting of positive charges induced by the avalanche into the gaseous fluid. It is possible, for example by using a delay line, to localize such a center of gravity and in doing so, to learn the position of the avalanche along the anode. What is then obtained is a mono-dimensional localization along the anode. Accuracy of the localization and spatial resolution are functions of the quality of the electronic measuring chain, of the nature and pressure of the gas, of the nature and energy of the particle or of the radiation. A resolution of 200 $\mu$m is usually obtained for X-rays of 8 KeV.

In certain applications, the detector comprises a plurality of parallel anodes, this increasing substantially the detection zone and permitting a two-dimension determination of the position.

Detectors of the aforesaid type, may be called rectilinear anode detectors because the anode or anodes which they contain are constituted by conducting wires of small diameter stretched between two points, an anchoring point and an electrical connection point, in order to extend in parallel to the cathodes and to the admission window.

In other applications, such as the study of the diffraction of X-rays, a localization along an arc of circle would be an advantage.

With spatial resolutions of between 1 and 2 mm, it is possible to use a layer of anode wires which adopts the shape of the circumference, reading of the pulses on said wires giving the position, as near as possible, of the radiation on the wires.

With rectilinear anode detectors and for special resolutions less than one millimeter, the angular opening which is observed, does not exceed a score of degrees. Beyond that, indeed, it becomes necessary to make allowance for the parallax phenomena due to the angle of incidence of the path followed by the particles with respect to the anode and due also to the position on said path from which said particle initiates the electron avalanche phenomenon.

Attempts made to correct the parallax have not permitted to reach a simple technological solution simply because the phenomenon of initiation of electron avalanche can be considered as very uncertain and liable to occur either upstream or downstream of the anode with respect to the plane traversing said anode and cutting through the direction of propagation of the particle.

A way to solve this problem could presumably be to produce gas-filled detectors of a curved type, comprising a body defining, on a concave face, a window whose radius of curvature is centered on the source of emission or reflection. The anode or anodes are constituted, in conventional manner, by a wire which is kept in a curved position by means of insulating rigid supports, whilst being centered on said radius.

This solution however is not feasible because the supports are responsible for the existence of zones which can be considered as dead zones, i.e. zones in which the electron avalanche phenomenon cannot occur as it should.

To overcome this, it has been proposed to produce the anode as a conducting wire of about 40$\mu$ diameter, initially arched or curved according to a pre-selected radius of curvature and over the angular range covered. Said anode is secured by its two ends on supports and is kept parallel to the admission window by interaction of the field of a voltage traversing it, with the magnetic field of two permanent magnets between which the wire extends.

A variant to this solution consists in keeping the wire constituting the anode in the wanted position by electrostatic effect.

These two possiblities have enabled measurements to be taken at laboratory or experimenting level. It has however been impossible to find a really satisfactory industrial application due to the delicate structure of the apparatus involved and to its sensitivity to any vibrations applied thereto or to its support and transmitted to the anode wire, which is held in the angular detection opening only by magnetic or electrostatic effect.

A third known solution, consists in producing a curved gas-filled detector, using as the anode, a conducting wire of hard steel, of larger cross-section, for example 0.20 mm, than the wire used in the preceding cases.

Said wire of larger cross-section can be curved and held in position, because of its mechanical properties, by anchoring its two ends, said ends being points of support and of conduction of an operating voltage.

Although, in theory, this last solution would seem to be the answer to the arising problem, in practice, it has been found that the radius of curvature and the length of the anode are rather limited, the result being that the angular resolution can often be inadequate.

This is due to the fact that, as its length increases, the anode becomes less stable and the detector becomes more and more fragile. And as with the aforementioned solutions, this one does not give protection against mechanical vibrations.

It is the object of the present invention to propose a new curved gas-filled detector which, technologically, eliminates all the aforesaid problems and which overcomes the drawbacks noted heretofore when producing curved detectors, with good spatial resolution, according to the known methods.

Another object of the invention is to propose a curved gas-filled detector able to withstand various mechanical conditions of work, and also to show high resistance to electrical breakdowns, but with dimensions not limited by mechanical problems.

Yet another object of the invention is to propose a curved gas-filled detector of rapid, simple and reliable construction, in which the anode or anodes require no regular and fine shaping operation.

A final aim of the invention is to enable the use as anode, of a basic product supplied in strips or plates in the trade, with varied physical characteristics permitting to relate the choice to the particular features of the detector to be built.

These objects are reached according to the invention with a curved gas-filled detector equipped with a spatial localization strip, wherein the pick-up means are constituted by a structure of the type with at least one curved conducting strip held in position by the body in order to project into the enclosure and of which one of the longitudinal edges is parallel to the axis of the window.

The invention will be more readily understood on reading the following description with reference to the accompanying drawings, in which.

Figure 1:
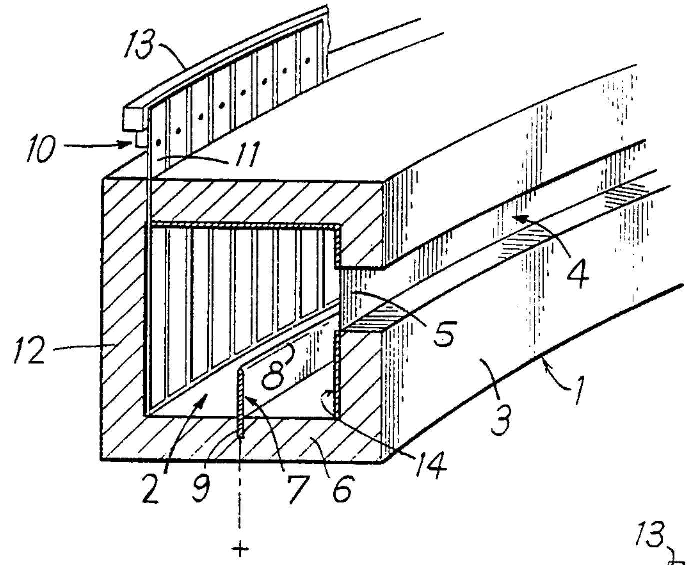
FIG. 1 is a perspective view of part of a curved detector according to the invention.

The curved gas-filled detector, for spatial localization, according to the invention is of the type comprising a body 1 of general tubular shape, defining an enclosure 2 designed to contain a gaseous fluid under a set pressure.

The body 1 is curved in design and as such presents a concave face 3, defined by a radius of curvature which is centered on the source of transmission or reflection of a radiation to be detected. Concave face 3 defines an admission window 4 which is, for example, closed by a disc 5 protecting the sealed confinement of the gaseous fluid. Disc 5 is produced from a suitable material, which is permeable to the radiation to be detected, such as for example Mylar or beryllium when the invention is applied to X-ray crystallography.

Another of the walls of the tubular body 1 and, preferably, the plane base 6, supports directly or indirectly, an elongated element 7 which is electrically insulated from the body 1 and is designed to constitute the electron avalanche anode. According to the invention, element 7 is formed by a conducting strip held so that one of its longitudinal edges, such as 8, extends parallel to the window 4, made conducting by an internal plating and forming a cathode with conductor element 14.

Conducting strip 7 is held so as to present a radius of curvature having the same center as the wall 3 and to this effect, its second longitudinal edge 9 may for example be fitted in an insulating support formed by or adapted on the body 1. This metallic strip 7 is connected electrically to a producing source capable of applying there to a constant positive potential. When live, edge 8 produces an electrical field which has an effect on the surrounding medium and on the gaseous fluid confined inside enclosure 2.

It is possible with this type of construction to be absolutely certain of the position occupied by edge 8 and of its conformation as a curved anode, centered exactly on the center of wall 3, so that all the points of that edge are exactly at equal distance from said center. And it is further possible with this type of construction to keep a linear anode stable and rigid by giving it a predetermined radius of curvature and by developing it over an angular area, with respect to the possibilities of dispersion of the emitted or reflected radiation. More generally, this type of constructions makes it possible to give to edge 8 any curved shape set beforehand for the detection.

To localize the spot in edge 8 where the avalanche of electrons occurs as a result of the impact of one elementary particle of the radiation to be detected, with the gaseous fluid, the curved gas-filled detector according to the invention is associated to a bar 10 for measuring how many positive charges, induced by the presence of positive ions resulting from the avalanche of electrons, have collected.

Bar 10 is constituted of cathode bands 11, which are conducting, extend in parallel manner and are directed orthogonally to edge 8. Said cathode bands are placed parallely to the plane of strip 7, for example along the inner face of wall 12 of body 1 opposite wall 3. Said cathode bands 11 traverse body 1, outside which they are connected to a delay line 13 of a conventionally known design.

According to FIG. 1, body 1 is made from an insulating material and is coated on the inside with a conducting layer 14, which forms a cathode, in the general sense of the word, and is insulated from the bands 11.

Figure 2:
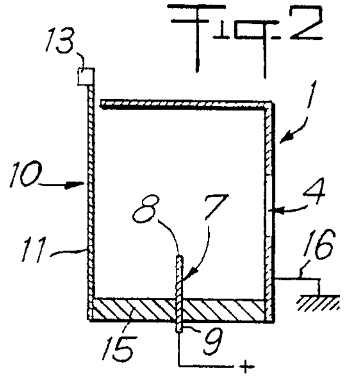
FIG. 2 is a diagrammatical cross-section showing the arrangement of the different electrodes.

FIG. 2 diagrammatically illustrates one example of embodiment in which body 1 is made from a conducting material and supports the strip 7 by way of a built-on wall element 15, made from insulating material. According to this embodiment, the body in conducting material is earthed via a connection 16. In such a case, the bar 10 is mounted in body 1 without any electrical contact or connection.

Whatever the case, body 1 contains means permitting to keep the enclosure 2 filled with the required gaseous mixture.

Figure 3:
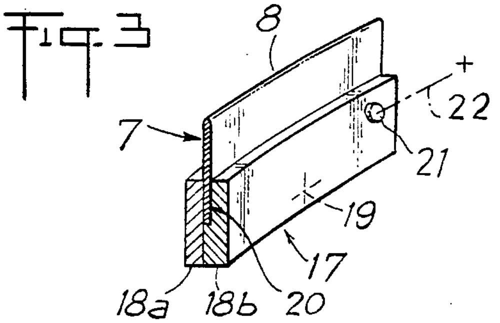
FIG. 3 is a perspective view of part of another embodiment of one of the elements constituting the invention.

According to a preferred embodiment of the invention, illustrated in FIG. 3, strip 7 is held in position inside body 1 by way of an intermediate support 17 which is preferably constituted by two complementary halves **18*a* and 18*b*. Said halves 18*a* and 18*b* are produced from an insulating material, and shaped so as to define when assembled together, a housing 20 inside which strip 7 is seized by its longitudinal edge 9**.

Complementary halves **18*a* and 18*b* are shaped so as to present, when assembled together, a curved shape centered on the center of curvature of wall 3. It is thus possible, with such a support as 17 to hold strip 7 firmly in a stable position and simultaneously to give it the wanted curvature. This means that strip 7 may be constituted by a conducting band of suitable thickness which is elastically or plastically deformable, and which is held in such deformed state by being fitted between the complementary parts 18***a* and 18*b*. In this particular case, one end of support 17 is equipped with a conductor terminal 21 to set up an electrical connection between strip 7 and a conductor 22 connecting said strip to a source of positive voltage compared to the cathode potential (which is generally earthed).

Figure 4:
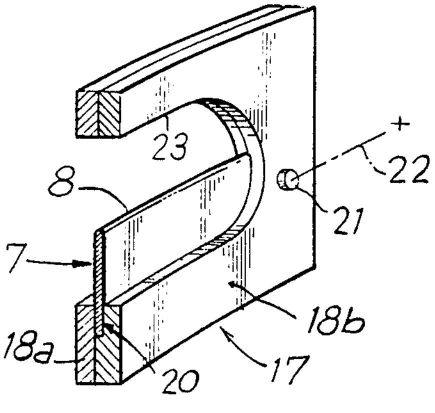
FIG. 4 is a perspective similar to FIG. 3, but showing another embodiment of the same constituting element.

FIG. 4 illustrates a variant embodiment wherein support 17 is designed to define a window 23 into which extends the edge 8 of strip 7 held as indicated hereinabove with reference to FIG. 3.

Good detection results are obtained by using a strip 7 in stainless steel, of thickness varying between 10 and 100μ.

A detector of the aforesaid type, containing in its enclosure 2 a gaseous fluid constituted by a mixture of argon, methane, forane 13B1, confined under a pressure of one bar, has given results of localization under constant working conditions with a strip of 40μ thickness to which was applied a positive voltage of 3700 volts, for a radiation X of 8 HeV of particle energy.

Particularly good results have been obtained in working conditions known as self-cutting light stream rate, using the following means:

| | |
|---|---|
| gaseous fluid: | |
| argon | 60% |
| ethane | 25% |
| Dimethylacetal formaldehyde | 15% |
| pressure | 2 bars |
| thickness | 40μ |
| voltage | 7000 volts |

With the above-indicated conditions, a halfway up spatial resolution of 180μ was obtained, i.e. in this particular experiment, an angular resolution of 0.05°.

The aforesaid results were obtained with a body 1 in stesalit having a front face in aluminium to rigidify the whole assembly.

In these constructions, the conducting strip had a linear length of 25 cm and was shaped according to a radius of curvature of 20 cm.

Figure 5:
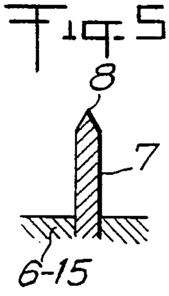
FIGS. 5 to 8 are diagrammatical views of different variants of one of the elements constituting the detector.
Figure 6:
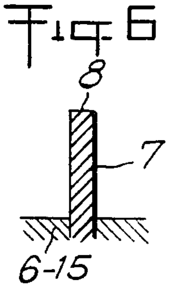

The active edge 8 of the aforesaid strip 7 can be of different shapes. Said edge 8 may be tapered (FIG. 5), or straight (FIG. 6) or rounded.

Figure 7:
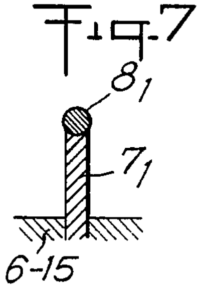

Said edge 8 may also be constituted by a wire $8_1$ fixed on in any suitable manner, such as by adhesive means, on a strip $7_1$ as illustrated in FIG. 7.

Figure 8:
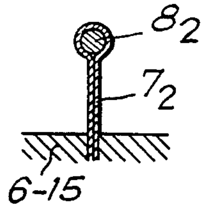

Another possibility is to produce edge 8 by shaping a strip $7_2$ about a wire $8_2$ as illustrated in FIG. 8.

The above examples are given non-restrictively, and the curved anode will retain the two functions of the invention with other geometrical shapes, these two functions being:

for strip 7, to support edge 8 and to keep the required curve without noticeably perturbing the electrical field, for edge 8, to be the part where the electrical field is highly strong and causes the phenomenon of avalanche.

As stated in the foregoing, the object of the invention permits a monodimensional detection of position.

Figure 9:
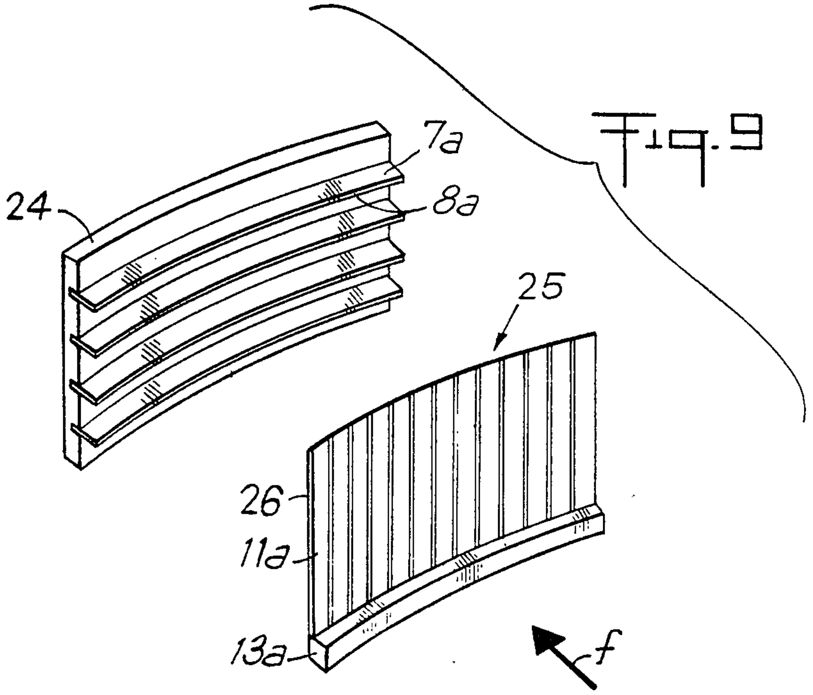
FIG. 9 is a diagrammatical view showing another embodiment of the detector according to the invention.

It is possible to produce a curved detector whose object is to obtain a two-dimensional detection with a structure such as that diagrammatically illustrated in FIG. 9. In said figure, the detector comprises, inside the sealed enclosure, an insulating support 24 supporting n curved strips 7*a*, the strips being for example embedded in said support. Strips 7*a* are parallel and directed so that their plane is parallel or substantially parallel to the direction of propagation of a particle or radiation. Each strip 7*a* presents a curved, generally concave edge 8*a*, facing the direction of propagation.

The determination of strip 7*a* which has received the avalanche, gives, by processing the negative electronic pulse initiated therein, the location inside dimension X.

The location inside dimension Y is obtained, as in the preceding example, by using a structure 25 of cathode bands 11*a* extending in parallel to edges 8*a* in a direction orthogonal to that of strips 7*a*. Cathode bands 11*a* are for example supported by a thin insulated support 26 and are connected to a delay line 13*a*. Said structure is placed upstream of edges 8*a* with respect to the direction of propagation along arrow f.

The invention is in no way limited to the description given hereinabove and on the contrary covers any modifications that can be brought thereto without departing from its scope.

What we claim is:

1. A curved gas-filled detector of the type comprising a curved body defining an enclosure containing a gaseous fluid under a certain pressure, and provided with a window for the admission of a radiation to be detected and comprising on the inside, at least one elongated element which is parallel to cathode electrodes of which one may be coinciding with the window, said elongated element being insulated from the body, and receiving a high positive voltage, and forming means of picking up the avalanche of electrons created by the impact of a particle or radiation caused to traverse the gaseous fluid detector wherein the pick-up means is constituted by a structure of the type with at least one curved conducting strip held in such a way by the body that it projects into the enclosure and that one of its longitudinal edges is parallel to the axis of the window.

2. A gas-filled detector as claimed in claim 1, wherein said detector comprises a strip which is curved according to a radius of curvature perpendicular to its plane.

3. A gas-filled detector as claimed in claim 1, wherein said detector comprises n strips which are parallel together and to the direction of radiation, each one having a curved edge facing the direction of propagation of said radiation.

4. A gas-filled detector as claimed in claim 1, wherein the thickness of the conducting strip may vary between 10 and 100μ.

5. A gas-filled detector as claimed in claim 1, wherein said strip is supported by a body in insulating material covered with a conducting layer on the inner faces of the walls other than those supporting the strip, which layer forms part of the cathode.

6. A gas-filled detector as claimed in claim 1, wherein said strip is supported by a support in insulating material adapted inside a body made of a conducting material.

7. A gas-filled detector as claimed in claim 1, wherein the conducting strip extends parallely to and between, on the one hand, the admission window, and on the other hand, a plurality of conducting parallel cathode bands, of direction orthogonal to that of the strip and said bands being connected to a delay line and the radius of curvature of said strip being perpendicular to its plane.

8. A gas-filled detector as claimed in claim 7, wherein said strip is supported by a support composed of two complementary halves which immobilize the strip and give it the wanted curvature.

9. A gas-filled detector as claimed in claim 3, wherein the parallel strips extend parallely to a cathode structure situated upstream of the strips with respect to the direction of propagation of the particle or radiation.

* * * * *